M. WILSON.
Stench-Trap.
No. 201,317.  Patented March 12, 1878.
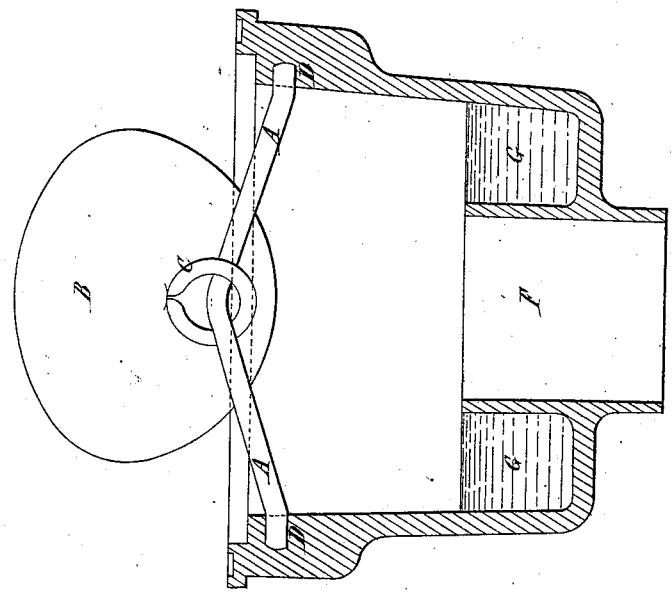
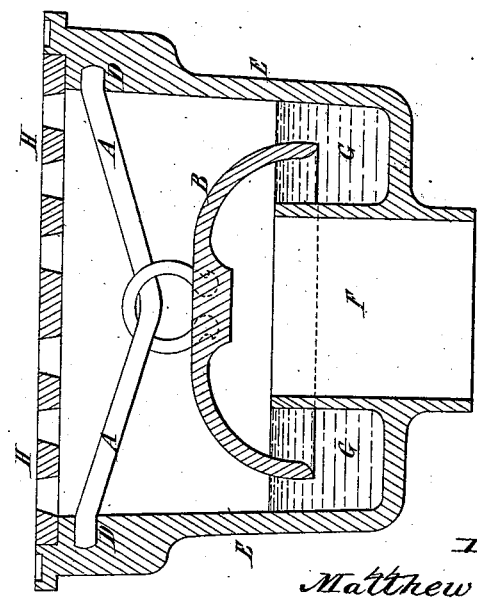
Inventor:
Matthew Wilson,
James L. Norris.
Attorney.
Witnesses:
A. H. Norris
W. B. Hale

UNITED STATES PATENT OFFICE.

MATTHEW WILSON, OF LONDON, ENGLAND.

IMPROVEMENT IN STENCH-TRAPS.

Specification forming part of Letters Patent No. 201,317, dated March 12, 1878; application filed December 31, 1877.

*To all whom it may concern:*

Be it known that I, MATTHEW WILSON, of Leadenhall street, in the city of London, merchant, in that part of the United Kingdom called England, have invented new and useful Improvements in Stench-Traps, which improvements are fully set forth in the following specification, reference being had to the accompanying drawings.

This invention relates to improvements in stench-traps, and refers to those traps known as "bell-traps;" and consists in so constructing them that they will effectually prevent the escape of foul air and gas from sinks, drains, and other receptacles, and be less liable to derangement from neglect of servants or otherwise than the stench-traps commonly used.

I construct my trap with a bell or inverted cup, to be placed over the aperture of the pipe through which the liquid passes from the trap, as heretofore.

My further improvements consists in substituting for the rigid or fixed bar now used a revolving cross bar or rod, to which the bell or inverted cup is attached by means of a loop inserted in the bell.

To carry out my improvements I drill a hole or socket, or this hole or socket may be formed by means of a core when cast, on each side of the case or box of the trap, into which the two ends of the bar are received and work loosely. The bar, being free to revolve, renders the link or chain used in former traps unnecessary, thus greatly reducing the depth of the trap.

One of the features of my present improvements is that, by economizing space, they are made available in many instances where my former and other traps cannot be used on account of their depth; and also in this, the bar can be driven out, if required, and replaced, whereas in the old trap this could not be done unless the trap was taken up.

The advantages of my improved bell-trap are, first, the bar works in a socket, thus allowing the bell to be turned up, so that the pipe, if choked, may be readily got at; second, it cannot get out of place through carelessness or neglect of servants, and another advantage of this principle is that the bell is so fixed that it cannot be removed; and, third, the old bell, for instance, being cast on the grating, and the grating having to be removed for cleansing, &c., the grating is oftener off than on, thereby rendering the trap of little or no service.

Such being the nature and object of my said improvements in the bell-trap, I will now proceed to describe the same in detail; and, in order that the invention may be fully understood, I have hereunto annexed a sheet of drawings illustrative thereof, and have marked the several views or figures with figures and letters of reference, the same letters referring to the same parts in both views or figures.

Figure 1 illustrates a vertical section of my improved stench-trap, and shows both the case and bell in section, with the bell down in its normal position. Fig. 2 illustrates a similar section of the same trap with the grating removed, and shows how the bell can be raised out of the case or box, so that every part of the trap can be thoroughly got at for the purpose of cleaning the same.

These improvements consist in substituting for a rigidly-fixed or lifting cross-bar, as shown in my former patent, a bent cross bar or rod, A, capable of rotation. To this bar or rod the bell or inverted cup B is attached by means of a hasp or loop, C, cast upon or inserted in the bell.

The cross bar or rod A is supported at its ends in holes, sockets, or bearings D and D, formed in the side of the case or box E of the trap, and sufficient freedom is allowed for the ends of the cross-bar A to work or turn very freely and loosely in the before-mentioned sockets or bearings D D. The cross-bar A is curved or bent in the middle in such a manner that, when it is turned half a revolution, the bell B, which hangs from this bend in the bar, is so considerably raised that its lowest portion is lifted clear of the top of the pipe F, and can, when required, be turned quite over onto the top of the bar A, as shown in Fig. 2, thus enabling every part of the bell B, of the pipe F, and of the annular water-space G to be readily got at, so that the whole of the parts can, with facility and ease, be quickly cleaned.

The normal position of the bar is with the bend downward, as shown in Fig. 1, which is the position it takes by its own gravity when free from control.

The bell B likewise has a tendency to gravitate to the bend in the center of the bar, (when the bend is downward,) and thus keeps itself centrally over the pipe F.

It will also be seen that one of the essential features of this my improved arrangement is that the space required by the parts of the trap is greatly reduced, whereby traps of my present arrangement are available in many instances where those constructed according to my former patent and other traps cannot be used by reason of the greater space they occupy, especially in depth.

The grating H is received in a recess or rabbet in the rim or top edge of the case or box E, in the usual manner.

Though I have shown on the drawing a curved bar or rod, I do not confine myself to that particular shape, as in some cases, if it should be thought desirable to have a bell that could not be moved, I may adopt a straight bar, driven into the sockets; and, should the pipe become choked, this bar can be driven out and replaced without the removal of the trap.

Having thus described the nature and object of my said invention, I claim as new and desire to secure by Letters Patent—

1. The combination, with the case or box, escape-pipe, and annular water-space of a stench-trap, of an inverted cup or bell, suspended over the escape-pipe, and adapted to be rotated to remove it from over said pipe, substantially as described.

2. The combination, with the case or box, escape-pipe, and water-space around the mouth of the said pipe, of an inverted cup or bell and a rotating cross-bar, to which the bell or cup is connected, substantially as and for the purpose described.

MATTHEW WILSON.

Witnesses:
GEO. DOWNING.
GEO. FORBES.